(12) United States Patent
Liu

(10) Patent No.: US 10,232,706 B2
(45) Date of Patent: Mar. 19, 2019

(54) VEHICLE AUTOMATIC TRANSMISSION AXLE ASSEMBLY

(71) Applicant: Peisheng Liu, Shijiazhuang (CN)

(72) Inventor: Peisheng Liu, Shijiazhuang (CN)

(73) Assignee: Peisheng Liu, Shijiazhuang (CN)

( * ) Notice: Subject to any disclaimer, the term of this patent is extended or adjusted under 35 U.S.C. 154(b) by 489 days.

(21) Appl. No.: 14/910,949

(22) PCT Filed: Aug. 6, 2014

(86) PCT No.: PCT/CN2014/083799
§ 371 (c)(1),
(2) Date: Feb. 8, 2016

(87) PCT Pub. No.: WO2015/018341
PCT Pub. Date: Feb. 12, 2015

(65) Prior Publication Data
US 2016/0200193 A1    Jul. 14, 2016

(30) Foreign Application Priority Data

Aug. 8, 2013  (CN) .......................... 2013 1 0342301

(51) Int. Cl.
*B60K 17/08*   (2006.01)
*B60K 17/16*   (2006.01)
(Continued)

(52) U.S. Cl.
CPC ................ *B60K 17/08* (2013.01); *B60K 1/00* (2013.01); *B60K 17/16* (2013.01); *F16H 3/46* (2013.01);
(Continued)

(58) Field of Classification Search
CPC ........................... F16H 2716/10; B60K 17/08
See application file for complete search history.

(56) References Cited

U.S. PATENT DOCUMENTS 1,367,264 A * 2/1921 Johanson ................ F16H 3/663
                                                        475/296
1,427,599 A * 8/1922 Johanson ............ F16H 61/0293
                                                        475/296
(Continued)

FOREIGN PATENT DOCUMENTS

CN     201235749    5/2009
CN     102490595    6/2012
(Continued)

OTHER PUBLICATIONS

International Search Report dated Nov. 2, 2014 from corresponding application No. PCTCN2014/083799.

*Primary Examiner* — Derek D Knight
(74) *Attorney, Agent, or Firm* — Hauptman Ham, LLP

(57) ABSTRACT

An automobile automatic transmission axle assembly: A power input shaft extends into a transmission compartment; the power input shaft in the transmission compartment is provided with a transmission mechanism; the transmission mechanism comprises a transmission sliding sleeve assembly, modified isolators, gear-position sun gears, planet gears, a planet carrier and gear rings; the gear-position sun gears, planet gears and gear rings constitute a mechanism having a fixed transmission ratio; the transmission sliding sleeve assembly fits the modified isolators. The automobile automatic transmission axle assembly realizes an integrated automatic transmission axle for electric vehicle.

8 Claims, 2 Drawing Sheets

(51) Int. Cl.
 *F16H 3/46* (2006.01)
 *F16H 37/08* (2006.01)
 *F16H 3/66* (2006.01)
 *B60K 1/00* (2006.01)
 *F16H 3/083* (2006.01)

(52) U.S. Cl.
 CPC ........... *F16H 3/66* (2013.01); *F16H 37/0813* (2013.01); *B60K 2001/001* (2013.01); *F16H 3/083* (2013.01); *F16H 2200/0039* (2013.01); *F16H 2200/201* (2013.01); *F16H 2200/2038* (2013.01)

(56) References Cited

U.S. PATENT DOCUMENTS

| | | | | | |
|---|---|---|---|---|---|
| 1,745,075 | A | * | 1/1930 | Wise | F16H 61/0293 475/296 |
| 1,986,045 | A | * | 1/1935 | Clayton | F16H 3/663 475/272 |
| 2,152,932 | A | * | 4/1939 | Swennes | F16H 3/50 475/231 |

FOREIGN PATENT DOCUMENTS

| | | |
|---|---|---|
| CN | 102720810 | 10/2012 |
| CN | 103104661 | 5/2013 |
| CN | 203009737 | 6/2013 |
| CN | 203500394 | 3/2014 |
| DE | 19960629 | 11/2001 |
| KR | 20080011486 | 2/2008 |

\* cited by examiner

VEHICLE AUTOMATIC TRANSMISSION AXLE ASSEMBLY

FIELD OF THE INVENTION

The present invention relates to the field of power transmission, particularly to an automobile automatic transmission axle assembly.

BACKGROUND OF THE INVENTION

Currently, if a vehicle wants to realize automatic transmission, usually it needs to have a complete unit necessary for forming transmission and the corresponding control and manipulation mechanisms. The structure is complex, the cost is high and the failure rate is high. If power and input and output components are included, in fact it is the heart vessel of the vehicle, a major component of a vehicle and a vulnerable spot of Chinese automobile technology. It is the key to the R&D and innovation of vehicles, electric vehicles in particular at present.

SUMMARY OF THE INVENTION

Under this background, in order to meet the requirement for raising vehicle performance and lowering cost, the present invention adopts new-type clutch and sliding components, makes design breakthrough in transmission principle and control mode and realizes light-weight, reliable and low-cost automatic transmission. An important embodiment of the present invention is high integration between motor and transmission. Plus a differential mechanism assembly (including power output shafts) and an axle body (axle case, which may comprise internal and external joints and suspension supports), an integrated automatic transmission axle for electric vehicle (EV) is realized. The structure is scientific and simple.

The present invention provides an automobile automatic transmission axle assembly. A power input shaft extends into a transmission compartment; the power input shaft in the transmission compartment is provided with a transmission mechanism; the transmission mechanism comprises a transmission sliding sleeve assembly, modified isolators, gear-position sun gears, planet gears, a planet carrier and gear rings; the gear-position sun gears, planet gears and gear rings constitute a mechanism having a fixed transmission ratio; the transmission sliding sleeve assembly fits the modified isolators.

Preferably, the modified isolators are located on the outer side of the transmission sliding sleeve assembly, and the transmission sliding sleeve assembly can slide between the power input shaft and the modified isolators along the power input shaft.

Preferably, the transmission mechanism directly outputs power through the output gears or output shafts, or drives the first and second power output shafts to rotate at a differential speed through a differential mechanism, the power input shaft is a hollow shaft and the first power output shaft passes through the inside of the power input shaft.

Preferably, the fixed transmission ratio is at least two.

Preferably, the modified isolators don't have an inner ring, and the transmission sliding sleeve assembly serves as the inner ring of the modified isolators, contacts the inside of every isolator and may slide laterally along the power input shaft spline.

Preferably, the transmission may be made into an integral body with the motor; when the motor rotates inwardly, the output shaft of the motor will be the power input shaft of the transmission; when the power rotates outwardly, the outer rotor will be connected to the gear ring or the planet carrier.

Preferably, this assembly may be additionally attached with an axle body or an axle case, and the axle case or axle body may comprise internal and external joints and suspension support foundation connecting pieces.

Preferably, the sun gear is a power input component, one of the planet carrier and gear ring serves as a power output component, and the other is used as a fixed component; or the gear ring is a power input component, one of the sun gear and planet carrier serves as a power output component and the other is used as a fixed component; or the planet carrier is a power input component, one of the sun gear and gear ring serves as a power output component and the other is used as a fixed component.

Preferably, the sun gear is a power input component, the planet carrier is a power output component, the outer wall layer of the gear ring is an integral circle and a part of the stationary case, and the interior of the case consists of a motor compartment and a transmission compartment.

Preferably, the transmission sliding sleeve assembly comprises a sliding sleeve, a pull ring and a lanyard or a shift fork; the pull ring and lanyard may be pulled manually or electrically; the transmission sliding sleeve assembly comprises a spring. The spring is disposed on the input shaft in a sleeved manner and may apply a push or full to the pull ring. The sliding sleeve may also be toggled by the shift fork.

Preferably, the transmission sliding sleeve assembly comprises a sliding sleeve, a pull ring and a lead screw; the lead screw is driven electrically.

In more detail, the scheme is as follows:

An automatic transmission axle assembly, wherein: its power access component, i.e.: the power input may be a gear or (motor) a spline shaft, the power output is differential output, and the automatic transmission section includes a power assembly integrating the sliding sleeve assembly, the isolator assembly and the planet gear set assembly or a parallel axis variable gear assembly.

The transmission axle may be made into an integral body with the motor to directly connect coaxially the transmission section and preferably is a hollow shaft. The motor output shaft is the power input shaft. The hollow shaft may output the spline through a differential mechanism. When the motor rotates inwardly, it may connect the oil orifice of the transmission section through the case to make for heat dissipation; or it may be cooled in form of water cooling of the case or cooling by blowing air inwardly; the assembly may be attached with a main reducing gear and an axle body (axle case). The axle body may comprise internal and external joints and suspension support foundation connecting pieces.

Preferably, the automatic transmission section of the transmission axle comprises a planet-row assembly of at least one row. The sun gear of the planet gear set assembly is a power input component, the planet carrier is a power output component, and the gear ring is a stationary case; alternatively, the sun gear is a power input component, the gear ring is a power output component, the planet carrier is a fixed part, etc.

Preferably, the outer layer wall of the gear ring of the planet gear set in this embodiment is an integral circle, a few circles of concentric gear rings separated by their inner walls and having different radius and addendum circle are arranged laterally in this integral circle, and mesh the planet gears inside a few groups of gear rings, and these planet gears are fixed by a same planet carrier. The tooth form of the gear rings and planet gears is different, in various sizes; and the number of teeth is different, too and decided by transmission ratio. The inner side of the planet gear meshes the corresponding sun gear. Inside the sun gear in each gear position, the outer ring of the isolator is connected to the inner wall of the gear. One end of the planet carrier is fixed to the motor case from which the power output shaft extends, i.e.: the interval wall of assembly (two rolling bearings or a rolling bearing and a sliding sleeve), and the other end is fixed to the case of the differential mechanism, i.e., another interval wall of the assembly. The gear ring and motor case are an integral structure with an interval wall (inside it there are a motor compartment and a transmission compartment).

On the transmission input spline shaft, two or more isolators are disposed in parallel in a sleeved manner. The sliding sleeve is disposed inside the isolators in the sun gears. Equivalently, the inner ring of each isolator is an integral sliding ring sleeve, which has a radial cylindrical convex in the middle and may slide laterally along the spline, i.e.: transmission sliding sleeve, sliding sleeve in a short. The sliding sleeve comprises a radial cylindrical convex in the middle, and flat bottoms on the two sides (or concave portions). On the flat bottoms, there are thin sleeves (sliding bearings), which may transect the radius and rotate around the outer diameter of the sliding sleeve. The outer diameter of the thin sleeves is same as the outer diameter of the cylindrical convex. The thin sleeves and the convex all may contact the rollers (wedges) inside the isolators without an inner ring in each gear position. They can rotate in a same direction and slide laterally.

On the outer ring wall of each separated isolator outside the sliding sleeve, there are two or more high/low-speed sun gears with different modulus and tooth number. When the sliding sleeve slides axially along the spline shaft, it may stop in a specific position according to control requirements. At the moment, the convex on the sliding sleeve may contact a specific isolator. The thin sleeves on the flat bottoms (or concave portions) of the sliding sleeve corresponds to other isolators. When the spline shaft rotates in a normal direction, the sliding sleeves and the convex rotate in a normal direction, too and drive the contacting isolators to rotate synchronously in a normal direction. The high or low sun gears fixed on the outer ring of the isolator in a specific gear position rotate synchronously, too. The output gear meshed with this gear also drives the vehicle to run in a high or low gear; at the moment, although the isolators corresponding to the flat bottom portions of the sliding sleeve rotate in a normal direction, the outer diameter of the flat bottoms is much smaller than the inner diameter of the internal circle of parallel wedges inside the isolator. The inside of wedges don't directly contact the corresponding flat bottoms on the sliding sleeve and can contact them only through the thin (shaft) sleeves, which are separately disposed on the flat bottoms (or concave portions) and may slide and rotate along them. When the sliding sleeves slide laterally as a whole, the flat bottoms on the sliding sleeves (or concave portions) and the thin sleeves sliding and rotating on them will contact the wedges inside a specific isolator. As the wedges inside the isolator are separated by the thin sleeves, only the sleeves slide and rotate between them and the flat bottoms. The isolators and wedges cannot rotate synchronously with the sliding sleeves as a whole. Likewise, the sun gear connected to it cannot rotate synchronously with the power input spline shaft. If the spline shaft drives the sliding sleeve to rotate in a reverse direction, it will slide away from the wedges of all the isolators rotating in a normal direction and won't drive them to rotate. When the convex on the sliding sleeve slides to a neutral position between isolators, none of the isolators will rotate. In other words, the machine is in a neutral position. When the sliding sleeve slides in this way under the action of the shift fork or pull ring lanyard, and the isolator and gear the convex corresponds to will be changed, and the machine will realize speed change, too.

When gear shift is needed, firstly, the power is disconnected instantaneously and the sliding sleeve is drawn laterally so that the isolator contacting the convex of the sliding sleeve changes. Accordingly, the sun gear or parallel axial gear connected to it in a specific gear position changes, thereby realizing shift of high/low gear. One or several isolators may be additionally disposed on the sliding sleeve of the spline shaft to change its normal rotation direction, i.e.: from reverse direction to normal direction (if installation in a reverse direction is adopted, the angle should be adjusted by 180 degrees during installation). When the spline shaft and the sliding sleeve rotate in a reverse direction, they will drive one or several isolators to rotate in its normal direction and make the backward gears to which they correspond rotate, in other words, realize back motion.

DESCRIPTION OF REFERENCE SIGNS

Figure 1:
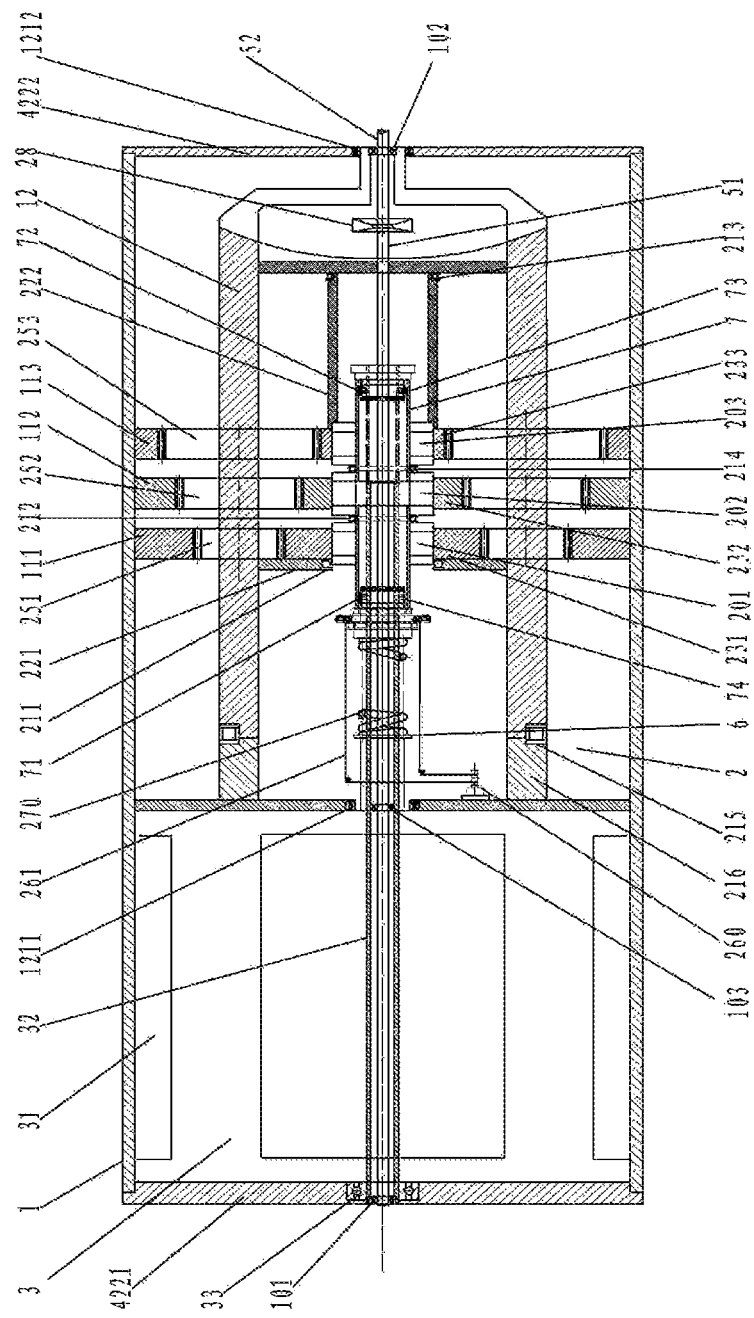
FIG. 1 is a schematic of the main structure of the automobile automatic transmission axle assembly provided by the present invention.
Figure 2:
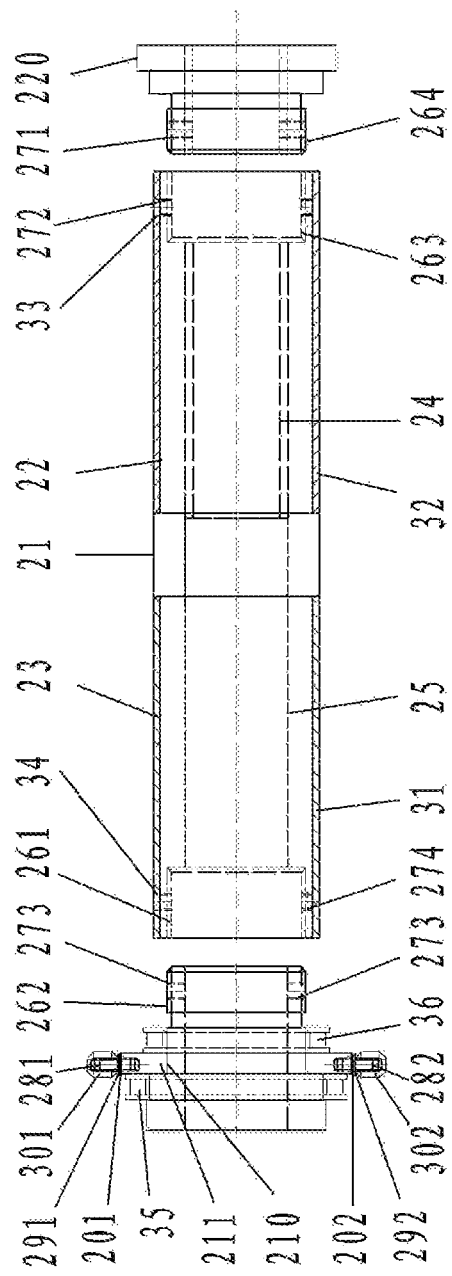
FIG. 2 is a detail drawing of the structure of a transmission sliding sleeve.

In FIG. 1: 1. case; 2. transmission compartment; 51. first differential power output shaft; 52. second differential power output shaft; 4221, 4222 assembly covers; 1211. motor rotor spindle axial bearing or concurrently planet carrier axial bearing; 1212 planet carrier bearing; 216. planet carrier support frame; 3. motor compartment; 33. motor rotor spindle axial bearing; 31. motor stator; 32. motor rotor spindle, meanwhile serving as power input of the transmission compartment, concurrently a variable shaft; 260. lanyard motor; 261. gear shift lanyard; 270. support (pressure) spring; 221, 222. support rings; 201, 202, 203. modified isolators; 251, 252, 253. planet gears; 111, 112, 113. gear rings; 211, 212, 213, 214, 215. thrust bearings; 231, 232, 233. gearshift sun gears; 28. differential mechanism; 12. planet carrier; 101, 102, 103. support power (differential) output shafts bearings; 6. support spring washer; 7. transmission sliding sleeve assembly; 71, 72, 73, 74. lock screws;

In FIG. 2: 21. convex of the sliding sleeve; 220. catch of the sliding sleeve; 23, 22. flat bottoms of the sliding sleeve; 24. locating spline of the sliding sleeve; 25. sliding spline of the sliding sleeve; 261, 262, 263, 354. internal and external threads of the sliding sleeve; 271, 272. locking screw holes; 281, 282. set screws of the lanyard (with hole); 291, 292. lanyard washers; 201, 202. lanyard holes; 210. shift fork slot or pull ring slot on the sliding sleeve; 211. pull ring on the sliding sleeve (in the pull ring slot); 301, 302. gland nuts of the lanyard; 31, 32, transitional (support) thin sleeve; 33, 34. through holes on the transitional thin sleeve for lock screws; 35, 36. thrust bearings.

DETAILED DESCRIPTION OF THE EMBODIMENTS

Below the present invention is further described by referring to the accompanying drawings.

In order to meet the requirement for raising vehicle performance and lowering cost, the present invention adopts new-type clutch and sliding components, makes design breakthrough in transmission principle and control mode and realizes light-weight, reliable and low-cost automatic transmission. An important embodiment of the present invention is high integration between motor and transmission. The assembly comprises a new-type automatic transmission axle integrating automatic transmission, power input (including motor) and output connecting pieces. It may be used as a front axle or rear axle of a battery electric vehicle (BEV) or a hybrid vehicle. This assembly may be attached with a differential mechanism assembly (including power output shaft) and an axle body (axle case, which may comprise internal and external joints and suspension supports). If a power output shaft (wheel) of internal combustion engine is connected at the power input shaft, it will become an automatic transmission axle of the internal combustion engine and may be used in vehicles and hybrid electric vehicles. If a motor is connected at the power input shaft, it will become an electrically operated automatic transmission axle and may be used in BEV and hybrid vehicles.

The present invention provides an automatic transmission drive axle assembly for automobile. Its power access component, i.e.: the power input may be a gear or (motor) a spline shaft, the power output is differential output, and the automatic transmission section includes series modified isolator assembly, comprising a sliding sleeve assembly, which contacts isolators in form of isolator inner ring and may slide laterally along the spline, a shift control component, such as: pull ring, and a transmission mechanism, i.e.: a power assembly integrating a modified planet-row assembly of more than two rows, which can output different speed (including gear ring, planet gear, planet carrier, sun gear) or a parallel axis variable gear assembly.

Preferably, the transmission and the motor may be made into one body, i.e.: the transmission compartment 2 and the motor compartment 3 share a case 1. If the motor rotates inwardly, the motor output shaft will be the transmission power input shaft 32. They are a same hollow shaft. The hollow shaft may output spline shafts 51, 52 through power (differential); if the motor rotates outwardly, the outer rotor will be connected to the gear ring or planet carrier; the motor connects the oil orifice of the transmission section through the case to make for heat dissipation, or may be cooled in form of water cooling of the case or cooling by blowing air into the machine.

Preferably, this assembly may be additionally attached with a decelerator and an axle body (axle case). The axle body may comprise internal and external joints and suspension support foundation connecting pieces.

The sun gear of the modified planet-row structure assembly, planet carrier and gear ring all may be used as power input components, power output components and fixed components.

Preferably, sun gears 231, 232, 233 of the modified planet-row structure assembly are power input components, planet carrier 12 is a power output component, and gear rings 111, 112, 113 are fixed on a same case. In other words, the outer wall layers of the gear rings of the planet gear set form an integral circular case 1.

Preferably, a few circles of concentric gear rings 111, 112, 113 of the planet gear set axially spaced on the inner wall and having different radius and addendum circle are arranged axially in the integral circle, and mesh the planet gears 251, 252, 253 inside a few groups of gear rings; these planet gears are fixed by a same planet carrier 12. The tooth form of the planet gears 251, 252, 253 and planet gears is different, in various sizes; and the number of teeth is different, too and decided by transmission ratio. One end of the planet carrier is fixed to the motor case i.e.: the interval wall of the assembly through the bearing 1211, or fixed to the interval wall through the thrust bearing 215 and the planet carrier support frame 216. The other end is connected to differential mechanism 28 of power output. The other end of the differential mechanism 28 is fixed to the other end of the case through bearing 1212. The inner sides of the planet gears 251, 252, 253 mesh corresponding sun gears 231, 232, 233. The gearshift sun gears 231, 232, 233 also have some difference in tooth form and tooth number. The inner walls of sun gears are connected and fixed with the outer rings of isolators 201, 202, 203. The outer wall layer of the gear ring of the planet gear set and the motor case are an integral structure with an interval wall (inside it there are a motor compartment and a transmission compartment).

The assembly comprises at least three layers of concentric (spline) shafts, sleeves, rings and circles.

Preferably, the series modified isolator assembly of the automatic transmission section comprises a transmission sliding sleeve assembly 7, which contacts the inside of each modified isolator in form of isolator inner ring and may laterally slide along the spline. The sliding sleeve assembly passes through the rollers (wedges) inside each isolator in the sun gear, equivalent to the position of the inner ring of each isolator. It is integral. The middle portion is radially expanded into a cylindrical sliding sleeve convex 21. On the narrowed concave portions 23, 22 on the two sides of the middle portion, there are transitional (support) thin sleeves (or axle sleeves, sliding bearings) 31, 32, which may transect the radius and rotate around the outer diameter of the sliding sleeve. Their outer diameter is same as the outer diameter of the cylindrical convex 21. The outer diameters of the thin sleeves 31, 32 and the convex 21 both may contact the rollers (wedges) inside the isolators without an inner ring in each gear position. They rotate synchronously in the same direction, slide away from each other in the reverse direction and slide laterally along the inner side.

Preferably, although the isolators 201, 203 to which the flat bottom portions of the sliding sleeve correspond can rotate in a normal direction, the inner side faces of the wedges (rollers) inside them don't directly contact the flat bottoms 23, 22 of the corresponding sliding sleeve. Instead, they indirectly contact them through the axle (thin) sleeves 31, 32 on the flat bottoms. The isolators 201, 203 don't rotate synchronously with the flat bottoms 23, 22, so the gears 231, 233 on the outer rings to which the isolators 201, 203 correspond certainly are unable to synchronously rotate and output kinetic energy and only idle with the planet gears they mesh.

Preferably, when the sliding sleeve 7 slides along the axial direction of the spline shaft 32, it stops in a specific position according to the control requirements. At the moment, the convex 21 on the sliding sleeve may contact a specific isolator, 202 for example. When the sliding sleeve 7 and the convex 21 rotate in a normal direction, they may drive the contacted isolator 202 to rotate synchronously in a normal direction. When they rotate in a reverse direction, the sliding sleeve 7 will slide away from specific isolator 202. When the spline shaft 32 rotates in a normal direction and the sliding sleeve 7 rotates synchronously, the convex 21 on the sliding sleeve and the specific isolator 202 it contacts will rotate synchronously. The high speed gear (sun) gear or low speed gear (sun gear) fixed on the outer ring of the specific isolator 202 in a specific gear position also rotates synchronously. The output gear (circle) meshed with the said high speed gear or low speed gear drives the rear axle to rotate in a high or low gear position.

When gear shift is needed, firstly, the power is disconnected instantaneously and the sliding sleeve 7 is drawn laterally so that the isolator contacting the convex of the sliding sleeve changes. Accordingly, the sun gear connected to it in a specific gear position changes, too.

Preferably, manual operation may be adopted if the operator wants so, or the operation is performed according to the preset software program based on speed change or operator's will. The computer outputs signal of instant disconnecting power and driving electromagnet to act. The sliding sleeve 7 on the spline shaft 32 and the convex 21 on it slide under the push of the pressure spring 270 and the action of the lanyard 261 of the shift fork or pull ring 211, realizing changes of shift gears under the drive of the sliding sleeve and achieving the objective of acceleration and deceleration.

Preferably, the sliding sleeve and the convex 21 on the sliding sleeve are controlled to slide to the neutral position outside the corresponding isolator under the action of the lanyard 261 or the shift fork and pull ring 211, thereby not driving any isolator to rotate, and realizing a neutral position of the machine.

Preferably, reverse to the normal rotation of a isolator on the sliding sleeve 7 of the spline shaft 32, the spline shaft and the sliding sleeve rotate in a reverse direction to drive one or several isolators to rotate in a normal direction and make the backward gears to which their isolators correspond rotate, thereby realizing back motion.

The action of the lanyard 261 upon the pull ring 211 of the sliding sleeve may be either manual pull or electric pull; the action of the spring 270 upon the pull ring 211 may be either push or pull; the sliding sleeve may either be pulled by the lanyard of the pull ring or be toggled by the shift fork.

The sliding sleeve 7 slides left and right under the action of the lanyard 261 and the spring 270. As a result, the machine realizes speed change.

Preferably, the sliding sleeve 7 may be pulled manually or electrically under the action of the lanyard 261 and the pull ring 211.

Without departing from the spirit and scope of the present invention determined in the claims, those skilled in the art may make various modifications to the foregoing content. Therefore, the scope of the present invention is not limited to the foregoing description and shall be determined by the scope of the Claims.

What is claimed is:

1. An automobile automatic transmission axle assembly, wherein: a power input shaft extends into a transmission compartment; the power input shaft in the transmission compartment is provided with a transmission mechanism; the transmission mechanism comprises a transmission sliding sleeve assembly, modified isolators using the transmission sliding sleeve assembly as an inner ring, gear-position sun gears, planet gears, a planet carrier and gear rings; the gear-position sun gears, planet gears and gear rings constitute a mechanism having a fixed transmission ratio; the transmission sliding sleeve assembly fits the modified isolators.

2. The automobile automatic transmission axle assembly according to claim 1, wherein: the transmission sliding sleeve assembly contacts the inside of each isolator and may laterally slide along a power input shaft spline.

3. The automobile automatic transmission axle assembly according to claim 1, wherein: the fixed transmission ratio is at least two.

4. The automobile automatic transmission axle assembly according to claim 1, wherein: the modified isolators are located on an outer side of the transmission sliding sleeve assembly, and the transmission sliding sleeve assembly can slide between the power input shaft and the modified isolators along the power input shaft.

5. The automobile automatic transmission axle assembly according to claim 1, wherein: this assembly may be additionally attached with an axle body or an axle case, and the axle case or axle body may comprise internal and external joints and suspension support foundation connecting pieces.

6. The automobile automatic transmission axle assembly according to claim 1, wherein: the sun gears are power input components, the planet carrier is a power output component, an outer wall layer of the gear ring is an integral circle and a part of a stationary case, and an interior of the case consists of a motor compartment and a transmission compartment.

7. The automobile automatic transmission axle assembly according to claim 1, wherein: the sun gear is a power input component, one of the planet carrier and gear ring serves as a power output component, and the other is used as a fixed component; or the gear ring is a power input component, one of the sun gear and planet carrier serves as a power output component and the other is used as a fixed component; or the planet carrier is a power input component, one of the sun gear and gear ring serves as a power output component and the other is used as a fixed component.

8. The automobile automatic transmission axle assembly according to claim 1, wherein: the transmission sliding sleeve assembly comprises a sliding sleeve, a pull ring and a lanyard or a sliding sleeve and a shift fork; the pull ring and lanyard may be pulled manually or electrically; the transmission sliding sleeve assembly comprises a spring; the spring is disposed on the input shaft in a sleeved manner and may apply a push or full to the pull ring; the sliding sleeve may also be toggled by the shift fork.

* * * * *